(12) United States Patent
Chai et al.

(10) Patent No.: US 11,741,532 B2
(45) Date of Patent: *Aug. 29, 2023

(54) SYSTEM AND METHOD TO AUTOMATICALLY DELIVER GIFT MEDIA

(71) Applicant: OpenTV, Inc., San Francisco, CA (US)

(72) Inventors: Crx K. Chai, Oakland, CA (US); Alex Fishman, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,313

(22) Filed: Dec. 2, 2021

(65) Prior Publication Data

US 2022/0164860 A1  May 26, 2022

Related U.S. Application Data

(63) Continuation of application No. 16/911,900, filed on Jun. 25, 2020, now Pat. No. 11,227,327, which is a continuation of application No. 15/376,135, filed on Dec. 12, 2016, now Pat. No. 10,733,662, which is a continuation of application No. 12/875,482, filed on Sep. 3, 2010, now abandoned.

(Continued)

(51) Int. Cl.
*G06Q 30/00* (2023.01)
*G06Q 30/0601* (2023.01)
*G06Q 20/12* (2012.01)

(52) U.S. Cl.
CPC ....... *G06Q 30/0641* (2013.01); *G06Q 20/123* (2013.01); *G06Q 30/0601* (2013.01); *G06Q 30/0603* (2013.01); *G06Q 30/0643* (2013.01)

(58) Field of Classification Search
CPC .......... G06Q 30/0641; G06Q 30/0603; G06Q 30/0601; G06Q 30/0643; G06Q 20/123
See application file for complete search history.

(56) References Cited

U.S. PATENT DOCUMENTS 5,459,306 A   10/1995  Stein et al.
6,633,849 B1  10/2003  Dodd
(Continued)

FOREIGN PATENT DOCUMENTS

CA   2773155       5/2018
CN   102598043 A   7/2012
(Continued)

OTHER PUBLICATIONS

"'Tis the Season for Virtual Gift Giving from Sprint," Business Wire, Dec. 13, 2006 (Year: 2006).*

(Continued)

*Primary Examiner* — Anne M Georgalas
(74) *Attorney, Agent, or Firm* — SCHWEGMAN LUNDBERG & WOESSNER, P.A.

(57) ABSTRACT

In various exemplary embodiments, a system and method to provide gift media is disclosed. The method includes receiving, at an interactive media component, a selection of the media item and a selection of at least one recipient for the media item from a user of a client device. A purchase transaction based on the selection of the media item and the at least one recipient is processed. Delivery of the media item to the at least one recipient is triggered.

20 Claims, 5 Drawing Sheets

Related U.S. Application Data (60) Provisional application No. 61/239,742, filed on Sep. 3, 2009.

(56) References Cited

U.S. PATENT DOCUMENTS

| | | | |
|---|---|---|---|
| 7,412,411 B2* | 8/2008 | Horel | G06Q 30/0631 |
| | | | 705/26.8 |
| 7,472,081 B1 | 12/2008 | Cason | |
| 7,734,917 B2 | 6/2010 | Chang et al. | |
| 7,937,443 B2 | 5/2011 | Curry et al. | |
| 8,024,762 B2 | 9/2011 | Britt | |
| 8,073,895 B2 | 12/2011 | Hamzeh et al. | |
| 8,131,645 B2 | 3/2012 | Lin et al. | |
| 8,190,519 B1* | 5/2012 | Angilivelil | G06Q 20/10 |
| | | | 705/39 |
| 8,234,261 B2* | 7/2012 | Monahan | G06F 16/48 |
| | | | 705/52 |
| 8,244,179 B2 | 8/2012 | Dua | |
| 8,266,064 B1 | 9/2012 | Kumar | |
| 8,484,227 B2* | 7/2013 | Svendsen | G06F 16/48 |
| | | | 707/753 |
| 8,695,031 B2 | 4/2014 | Kumar et al. | |
| 8,799,166 B1 | 8/2014 | Burkholder et al. | |
| 8,874,645 B2* | 10/2014 | Espelien | H04N 21/4788 |
| | | | 709/204 |
| 8,904,414 B2* | 12/2014 | Ku | H04N 21/6543 |
| | | | 725/60 |
| 8,949,922 B2* | 2/2015 | Perlman | H04N 21/64322 |
| | | | 463/40 |
| 9,137,580 B2 | 9/2015 | Scott et al. | |
| 9,226,012 B2 | 12/2015 | Mckissick et al. | |
| 9,276,761 B2* | 3/2016 | Scott | H04N 21/234318 |
| 9,536,233 B2 | 1/2017 | Piepenbrink et al. | |
| 10,733,662 B2 | 8/2020 | Chai et al. | |
| 11,227,327 B2 | 1/2022 | Chai et al. | |
| 2002/0016749 A1 | 2/2002 | Borecki et al. | |
| 2002/0032905 A1 | 3/2002 | Sherr et al. | |
| 2003/0050815 A1 | 3/2003 | Seigel et al. | |
| 2003/0083961 A1 | 5/2003 | Bezos et al. | |
| 2004/0044588 A1 | 3/2004 | Smith et al. | |
| 2004/0064377 A1 | 4/2004 | Ergo et al. | |
| 2004/0110578 A1 | 6/2004 | Orlowski et al. | |
| 2005/0080845 A1 | 4/2005 | Gopinath | |
| 2005/0249139 A1 | 11/2005 | Nesbit | |
| 2006/0059052 A1* | 3/2006 | Piccionelli | G06Q 30/0601 |
| | | | 705/26.1 |
| 2006/0095338 A1 | 5/2006 | Seidel | |
| 2006/0123455 A1 | 6/2006 | Pai et al. | |
| 2006/0167940 A1 | 7/2006 | Colton et al. | |
| 2006/0190966 A1* | 8/2006 | McKissick | H04N 7/147 |
| | | | 348/E7.071 |
| 2007/0080214 A1 | 4/2007 | Collas et al. | |
| 2007/0143189 A1 | 6/2007 | Mitchem | |
| 2007/0284439 A1 | 12/2007 | Rosenblatt | |
| 2008/0066114 A1* | 3/2008 | Carlson | H04N 21/47 |
| | | | 348/E7.071 |
| 2008/0208963 A1 | 8/2008 | Eyal et al. | |
| 2008/0228597 A1 | 9/2008 | Sondles | |
| 2008/0294526 A1 | 11/2008 | Berkowitz et al. | |
| 2008/0319833 A1 | 12/2008 | Svendsen | |
| 2009/0007216 A1 | 1/2009 | Ku et al. | |
| 2009/0054092 A1 | 2/2009 | Stonefield et al. | |
| 2009/0132383 A1 | 5/2009 | Piepenbrink et al. | |
| 2009/0234876 A1 | 9/2009 | Schigel et al. | |
| 2009/0259561 A1 | 10/2009 | Boys et al. | |
| 2010/0082448 A1 | 4/2010 | Lin et al. | |
| 2010/0082489 A1 | 4/2010 | Lin et al. | |
| 2010/0131385 A1 | 5/2010 | Harrang et al. | |
| 2011/0060661 A1 | 3/2011 | Chai et al. | |
| 2017/0091855 A1 | 3/2017 | Chai et al. | |
| 2020/0387958 A1 | 12/2020 | Chai et al. | |

FOREIGN PATENT DOCUMENTS

| | | |
|---|---|---|
| IN | 2564DELNP2012 A | 8/2015 |
| JP | 2002006860 A | 1/2002 |
| JP | 2002530947 A | 9/2002 |
| JP | 2003006456 A | 1/2003 |
| JP | 2003530778 A | 10/2003 |
| JP | 2004040221 A | 2/2004 |
| JP | 2005149367 A | 6/2005 |
| JP | 2007535759 A | 12/2007 |
| JP | 2008219336 A | 9/2008 |
| JP | 2008292863 A | 12/2008 |
| KR | 100674705 B1 | 1/2007 |
| MX | 338614 B | 4/2016 |
| RU | 2595771 C2 | 8/2016 |
| WO | WO-0217093 A1 | 2/2002 |
| WO | WO-2004110578 A1 | 12/2004 |
| WO | WO-2005109182 A2 | 11/2005 |
| WO | WO-2009046324 A2 | 4/2009 |
| WO | WO-2011029039 A1 | 3/2011 |

OTHER PUBLICATIONS

"Apple Store, Shipping & Delivery", [retrieved from the Internet on Feb. 18, 2015] <URL: http://web.archive.org/web/20090630233408/http://store.apple.com/us/help/shipping_delivery?>, (Jun. 30, 2009), 3 pgs.

"U.S. Appl. No. 12/875,482, Response filed Mar. 21, 2013 to Final Office Action dated Dec. 21, 2012", 11 pgs.

"U.S. Appl. No. 12/875,482, Final Office Action dated Apr. 22, 2015", 40 pgs.

"U.S. Appl. No. 12/875,482, Final Office Action dated Aug. 11, 2016", 41 pgs.

"U.S. Appl. No. 12/875,482, Final Office Action dated Dec. 21, 2012", 19 pgs.

"U.S. Appl. No. 12/875,482, Non Final Office Action dated Jan. 14, 2016", 43 pgs.

Et al., "U.S. Appl. No. 12/875,482, Non Final Office Action dated Jun. 22, 2012", 21 pgs.

"U.S. Appl. No. 12/875,482, Non Final Office Action dated Sep. 11, 2014", 29 pgs.

"U.S. Appl. No. 12/875,482, Response filed Jan. 12, 2015 to Non Final Office Action dated Sep. 11, 2014", 19 pgs.

"U.S. Appl. No. 12/875,482, Response filed May 24, 2016 to Non Final Office Action dated Jan. 24, 2016", 20 pgs.

"U.S. Appl. No. 12/875,482, Response filed Jul. 22, 2015 to Final Office Action dated Apr. 22, 2015", 25 pgs.

"U.S. Appl. No. 12/875,482, Response filed Oct. 22, 2012 to Non Final Office Action dated Jun. 22, 2012", 12 pgs.

"U.S. Appl. No. 15/376,135, Examiner Interview Summary dated Feb. 5, 2020", 3 pgs.

"U.S. Appl. No. 15/376,135, Final Office Action dated Nov. 1, 2019", 11 pgs.

"U.S. Appl. No. 15/376,135, Non Final Office Action dated Mar. 19, 2019", 22 pgs.

"U.S. Appl. No. 15/376,135, Notice of Allowance dated Mar. 26, 2020", 20 pgs.

"U.S. Appl. No. 15/376,135, Preliminary Amendment filed Jan. 3, 2017", 7 pgs.

"U.S. Appl. No. 15/376,135, Response filed Feb. 3, 2020 to Final Office Action dated Nov. 1, 2019", 10 pgs.

"U.S. Appl. No. 15/376,135, Response filed Aug. 19, 2019 to Non-Final Office Action dated Mar. 19, 2019", 15 pgs.

"U.S. Appl. No. 16/911,900, Examiner Interview Summary dated Aug. 18, 2021", 2 pgs.

"U.S. Appl. No. 16/911,900, Non Final Office Action dated May 25, 2021", 17 pgs.

"U.S. Appl. No. 16/911,900, Notice of Allowance dated Sep. 3, 2021", 13 pgs.

"U.S. Appl. No. 16/911,900, Preliminary Amendment filed Aug. 31, 2020", 7 pgs.

"U.S. Appl. No. 16/911,900, Response filed Aug. 24, 2021 to Non Final Office Action dated May 25, 2021", 10 pgs.

(56) References Cited

OTHER PUBLICATIONS

"Australian Application Serial No. 2010289306, Examiner's Search Report dated Apr. 7, 2014", 4 pgs.
"Australian Application Serial No. 2010289306, Response filed Jan. 15, 2015", 18 pgs.
"Australian Application Serial No. 2010289306, Response filed Sep. 7, 2015 to Subsequent Examiners Report dated Feb. 18, 2015", 26 pgs.
"Australian Application Serial No. 2010289306, Subsequent Examiners Report dated Feb. 18, 2015", 4 pgs.
"Brazil Application Serial No. 1120120048040, Office Action dated Jun. 18, 2021", with English translation, 9 pages.
"Brazilian Application Serial No. 1120120048040, Office Action dated Feb. 6, 2020", (w/English Translation), 7 pgs.
"Brazilian Application Serial No. 1120120048040, Response filed May 8, 2020 Office Action dated Feb. 6, 2020", with English claims, 37 pages.
"Canadian Application Serial No. 2,773,155, Office Action dated Oct. 1, 2015", 5 pgs.
"Canadian Application Serial No. 2,773,155, Office Action dated Oct. 24, 2016", 5 pgs.
"Canadian Application Serial No. 2,773,155, Office Action dated Dec. 23, 2014", 4 pgs.
"Canadian Application Serial No. 2,773,155, Response filed Apr. 1, 2016 to Office Action dated Oct. 1, 2015", W/ English Translation, 27 pgs.
"Canadian Application Serial No. 2,773,155, Response filed Apr. 24, 2017 to Office Action dated Oct. 24, 2016", 32 pgs.
"Canadian Application Serial No. 2,773,155, Response filed Jun. 23, 2015 to Office Action dated Dec. 23, 2014", 17 pgs.
"Chinese Application Serial No. 201080049849.8, Decision of Rejection dated May 3, 2017", W/ English Translation, 13 pgs.
"Chinese Application Serial No. 201080049849.8, Notice of Reexamination dated Sep. 6, 2018", (w/English Translation), 18 pages.
"Chinese Application Serial No. 201080049849.8, Office Action dated Apr. 13, 2015", (w/English Translation), 14 pgs.
"Chinese Application Serial No. 201080049849.8, Office Action dated Jun. 15, 2016", W/ English Translation, 12 pgs.
"Chinese Application Serial No. 201080049849.8, Office Action dated Jul. 30, 2014", (w/English Translation), 7 pgs.
"Chinese Application Serial No. 201080049849.8, Office Action dated Dec. 1, 2016", W/ English Translation, 12 pgs.
"Chinese Application Serial No. 201080049849.8, Office Action dated Dec. 7, 2015", W/ English Translation, 4 pgs.
"Chinese Application Serial No. 201080049849.8, Response filed Feb. 22, 2016 to Office Action dated Dec. 7, 2015", (w/English Translation), 24 pgs.
"Chinese Application Serial No. 201080049849.8, Response filed Mar. 28, 2017 to Office Action dated Dec. 1, 2016", with English Translation, 7 pgs.
"Chinese Application Serial No. 201080049849.8, Response filed Aug. 12, 2015 to Office Action dated May 20, 2015", (w/English Translation), 27 pgs.
"Chinese Application Serial No. 201080049849.8, Response filed Aug. 16, 2017 to Decision of Rejection dated May 3, 2017", W/ English Translation, 13 pgs.
"Chinese Application Serial No. 201080049849.8, Response filed Aug. 26, 2016 to Office Action dated Jun. 15, 2016", (w/English Translation), 21 pgs.
"Chinese Application Serial No. 201080049849.8, Response filed Dec. 10, 2014 to Office Action dated Jul. 30, 2014", (w/English Translation), 20 pgs.
"Chinese Application Serial No. 201080049849.8, Response Filed Dec. 21, 2018 to Notice of Reexamination dated Sep. 6, 2018", (w/English Translation), 20 pgs.
"Chinese Application Serial No. 2010800498498, Voluntary Amendment filed Dec. 24, 2012", (w/English Translation), 13 pgs.
"Cricket Communications Announces Agreement of Fun New Mobile Entertainment Service Powered by NMS Communications", Business Wire, (Mar. 27, 2007).

"Esker Introduces Esker on Demand for AppExchange at Dreamforce '05", Business Wire [New York],, (Sep. 12, 2005).
"European Application Serial No. 10814580.6, Extended European Search Report dated Oct. 15, 2013", 4 pgs.
"European Application Serial No. 10814580.6, Response filed Apr. 10, 2014", 6 pgs.
"Indian Application Serial No. 2564/DELNP/2012, Amendment filed Sep. 16, 2013", 9 pgs.
"Indian Application Serial No. 2564/DELNP/2012, Office Action dated Apr. 20, 2018", w/English Translation, 6 pgs.
"Indian Application Serial No. 2564/DELNP/2012, Office Action dated May 31, 2021", 13 pages.
"Indian Application Serial No. 2564/DELNP/2012, Response filed Aug. 2, 2018 to Office Action dated Apr. 20, 2018", with English translation, 21 pgs.
"Indian Application Serial No. 2564/DELNP/2012, Response filed Oct. 21, 2021 Office Action dated May 31, 2021", 30 pgs.
"International Application Serial No. PCT/US2010/047874, Demand filed Jul. 1, 2011", 15 pgs.
"International Application Serial No. PCT/US2010/047874, International Preliminary Report on Patentability dated Oct. 20, 2011", 18 pgs.
"International Application Serial No. PCT/US2010/047874, International Search Report dated Oct. 19, 2010", 4 pgs.
"International Application Serial No. PCT/US2010/047874, Written Opinion dated Oct. 19, 2010", 4 pgs.
"Japanese Application Serial No. 2012-528099, Examiners Decision of Final Refusal dated Jun. 10, 2014", W/ English Translation, 4 pgs.
"Japanese Application Serial No. 2012-528099, Office Action dated Dec. 3, 2013", W/ English Translation, 7 pgs.
"Japanese Application Serial No. 2012-528099, Response filed Apr. 23, 2014 to Office Action dated Dec. 3, 2013", (w/Machine English Translation), 5 pgs.
"Japanese Application Serial No. 2012-528099, Voluntary Amendment filed May 21, 2013", (w/Machine English Translation), 9 pgs.
"Japanese Application Serial No. 2014-208456, Amendment filed Nov. 7, 2014", (w/Machine English Translation), 7 pgs.
/ "Japanese Application Serial No. 2014-208456, Office Action dated Sep. 1, 2015", W/ English Translation, 13 pgs.
"Japanese Application Serial No. 2014-208456, Response filed Dec. 18, 2015 to Office Action dated Sep. 1, 2015", (w/English Translation), 26 pgs.
"Korean Application Serial No. 10-2012-7008506, Final Office Action dated Jan. 31, 2017", With English Translation, 5 pgs.
"Korean Application Serial No. 10-2012-7008506, Office Action dated Jul. 7, 2016", W/ Machine Translation, 10 pgs.
"Korean Application Serial No. 10-2012-7008506, Response filed Sep. 5, 2016 to Office Action dated Jul. 7, 2016", W/ Machine Translation, 17 pgs.
"Korean Application Serial No. 1020177012121, Final Office Action dated Dec. 28, 2017", (w/English Translation), 7 pgs.
"Korean Application Serial No. 1020177012121, Office Action dated Mar. 23, 2018", with English Translation, 6 pgs.
"Korean Application Serial No. 1020177012121, Office Action dated Jun. 12, 2017", W/ English Translation, 10 pgs.
"Korean Application Serial No. 1020177012121, Response filed Feb. 23, 2018 to Final Office Action dated Dec. 28, 2017", with English Translation, 11 pgs.
"Korean Application Serial No. 1020177012121, Response filed Aug. 10, 2017 to Office Action dated Jun. 12, 2017", (w/English Translation), 28 pgs.
"Korean Application Serial No. 10-2012-7008506, Voluntary Amendment filed Apr. 2, 2012", with Concise Statement of Relevance Under 37 CFR 1_98, 6 pages.
"Mexican Application Serial No. MX/a/2012/002756, English Translation of Office Action dated Oct. 22, 2014", 6 pgs.
"Mexican Application Serial No. MX/a/2012/002756, Office Action dated Aug. 30, 2013", 3 pgs.
"Mexican Application Serial No. MX/a/2012/002756, Response filed Feb. 9, 2015 to Office Action dated Oct. 22, 2014", (w/English Translation), 29 pgs.

(56) References Cited

OTHER PUBLICATIONS

"Mexican Application Serial No. MX/a/2012/002756, Response filed Jun. 6, 2014 to Office Action dated Apr. 16, 2014", (w/English Translation), 16 pgs.

"Mexican Application Serial No. MX/a/2012/002756, Response filed Aug. 17, 2015 to Office Action dated Oct. 22, 2014", (w/English Translation), 62 pgs.

"Mexican Application Serial No. MX/a/2012/002756, Response filed Oct. 7, 2013 to Office Action dated Aug. 30, 2013", (w/English Translation), 22 pgs.

"Russian Federation Application Serial No. 2012107232, Office Action dated Feb. 14, 2015", W/ English Translation, 17 pgs.

"Russian Federation Application Serial No. 2012107232, Office Action dated Oct. 28, 2015", W/ English Translation, 13 pgs.

"Russian Federation Application Serial No. 2012107232, Response filed Feb. 11, 2016 to Office Action dated Oct. 28, 2015", with English claims, 26 pages.

"Russian Federation Application Serial No. 2012107232, Response filed Jun. 26, 2015 to Office Action dated Feb. 14, 2015", with English claims, 19 pages.

Bruno, Antony, "Can digital sales save the season? Growth in online retail may start slowing", Billboard 120.49: 20(2), The Nielsen Company, (Dec. 6, 2008), 3 pgs.

Halkos, Dimitris, et al., "A Secure Framework Exploiting Content Guided and Automated Algorithms for Real Time Video Searching", Multimedia Tools and Applications, 42.3, (May 2009), 343-375.

Tsuji, Masayuki, "Evaluation of present strategies in multiagent product market model with network externality", Search Report of the Information Processing Society of Japan, vol. 2004, No. 29, (Mar. 17, 2004), 19-24.

\* cited by examiner

SYSTEM AND METHOD TO AUTOMATICALLY DELIVER GIFT MEDIA

RELATED APPLICATIONS

This application is a continuation of U.S. patent application Ser. No. 16/911,900, filed on Jun. 25, 2020, which is a continuation of U.S. patent application Ser. No. 15/376,135, filed on Dec. 12, 2016, which is a continuation of U.S. patent application Ser. No. 12/875,482, filed on Sep. 3, 2010, which application claims the priority benefit of U.S. Provisional Patent Application Ser. No. 61/239,742, filed on Sep. 3, 2009, which applications are incorporated herein by reference in their entireties.

FIELD

The present application relates generally to the field of electronic communications and, in one example embodiment, to a system and method to provide media as a gift.

BACKGROUND

Television program distribution systems are available that provide video-on-demand (VOD) to subscribers. Similarly, other forms of digital distribution systems, such as music or book downloads exist. Conventionally, a subscriber or user of a distribution system selects and purchases media (e.g., VOD, music, books) for themselves.

BRIEF DESCRIPTION OF THE DRAWINGS

Various ones of the appended drawings merely illustrate example embodiments and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although various example embodiments discussed below focus on a digital video distribution system, the embodiments are given merely for clarity in disclosure. Thus, any type of digital or tangible media distribution system, including various system architectures, may employ various embodiments of the system and method described herein and be considered as being within a scope of example embodiments. Each of a variety of example embodiments is discussed in detail below.

Example embodiments described herein provide systems and methods to provide media items as a gift. In one embodiment, the media item comprises a video-on-demand (VOD) provided to at least one remote unit or device (e.g., Set-Top-Box, personal computer, mobile devices such as a smart phone, or the like) of another individual, for example, via a television channel or sub-channel in a targeted media display environment. In alternative embodiments, the media item may comprise audio media items or other digital media items. Further still, the media item may be provided in a tangible medium such as, for example, a DVD or Blu-ray disc based on a purchase performed via embodiments of the present system. Additionally, the media item may comprise a service such as a premium channel (e.g., pay-for channel), a subscription plan for a media distribution service (e.g., of one or more premium channels), or an upgraded subscription plan. In yet further embodiments, the media item may be a widget or an interactive application (e.g., an application for a smart phone).

Figure 1:
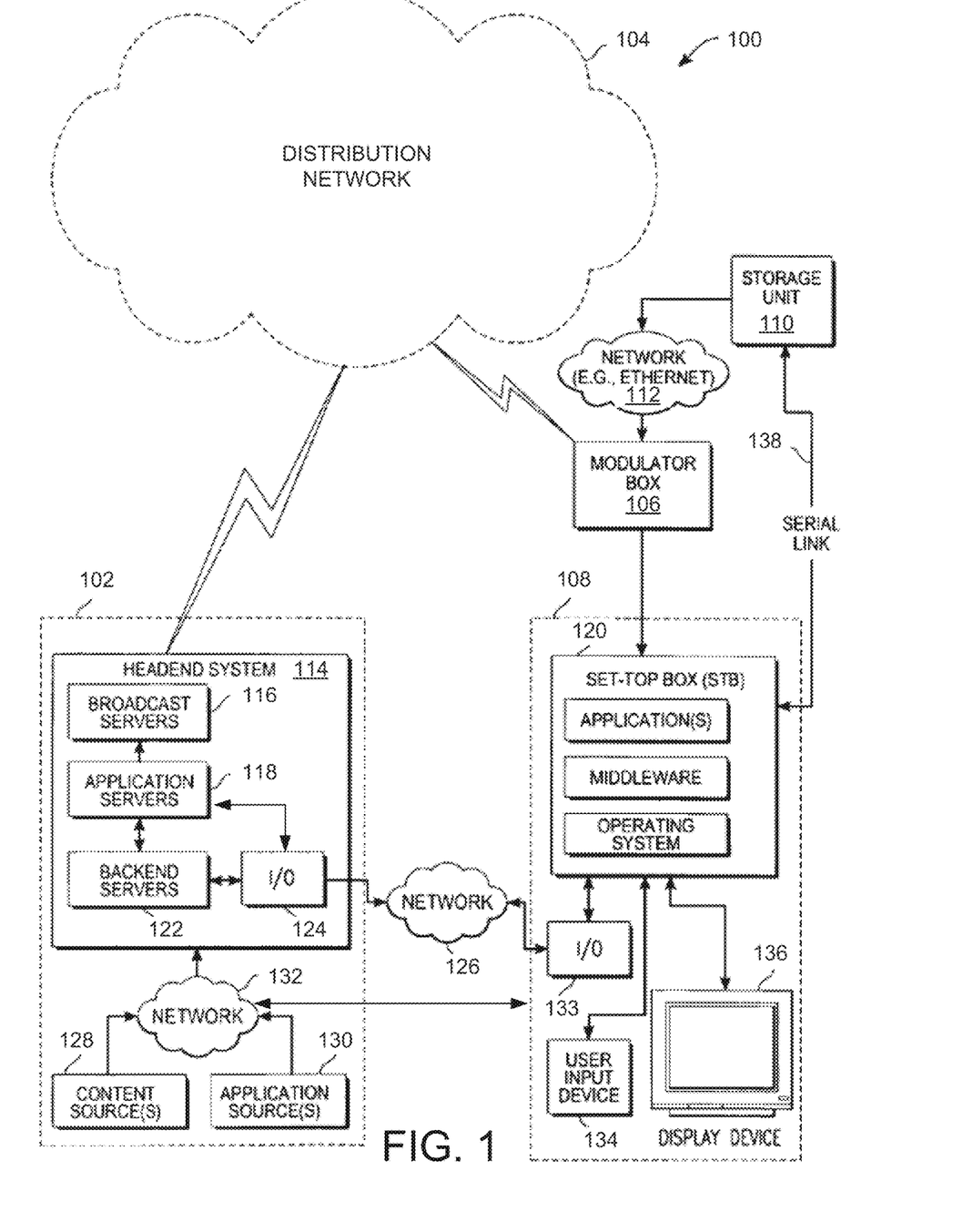
FIG. 1 is a block diagram illustrating an example embodiment of a network architecture of an example interactive media environment.

FIG. 1 illustrates a network architecture of an example interactive media environment 100 wherein the present invention may be deployed. The interactive media environment 100 includes a source system 102 that communicates data (e.g., media content data and interactive application data) via a distribution network or system 104 (e.g., the Internet, a mobile communication network, satellite network, cable network, or any other network capable of communicating or broadcasting digital data) and a modulator box 106 to a receiver system 108. In one example embodiment, the interactive media environment 100 optionally includes a storage unit 110 (e.g., personal computer) that communicates stored data via a network 112 to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with locally stored data provided by the storage unit 110 within the user's home.

Turning first to the source system 102, an example headend system 114 is an interactive media component that operates to communicate the data as, for example, a broadcast transmission. To this end, the headend system 114 is shown to include one or more broadcast servers 116 and, optionally, one or more application servers 118. Each of the broadcast servers 116 may operate to receive, encode, packetize, multiplex, modulate, and broadcast data from various sources and of various types. While the example embodiment is described herein as transmitting data from the headend system 114 as a broadcast, it will be appreciated that the relevant data could also be unicast or multicast from the source system 102 via the distribution system 104 and modulator box 106 to the receiver system 108. In various embodiments, data could also be transmitted from the source system 102 via a network connection to the receiver system 108. Further, in other example embodiments the source system 102 may be modified to facilitate communications via the Internet, a mobile phone network, or any other network capable of communicating digital data.

Each application server 118, in one example embodiment, compiles and provides interactive data modules to the broadcast server 116. The interactive data modules may also include, for example, data that is utilized by an interactive television application. The application server 118 may also include multiplexing functionality to enable multiplexing of, for example, interactive television applications and associated data with audio and video signals received from various sources. The application server 118 may also have the capability to feed (e.g., stream) multiple interactive television applications to one or more broadcast servers 116 for distribution to the receiver system 108. To this end, each application server 118 may implement a so-called "carousel," whereby code and data modules are provided to a broadcast server 116 in a cyclic, repetitive manner for inclusion within a transmission from the headend system 114. In other embodiments, code may reside permanently in a set-top box (STB) 120 (e.g., the code may be stored in non-volatile memory of the STB 120), may be pushed or downloaded to the STB 120, or be provided to the STB 120 in any other manner.

In one embodiment, one or more of the application servers 118 provide a purchase engine that allows a user to purchase media for others. The purchase engine will be discussed, by way of example, in more detail in connection with FIG. 2.

The headend system 114 is also shown, by way of example, to include one or more backend servers 122, which are coupled to the application servers 118 and to an input/output device 124 (e.g., a modem pool). Specifically, the I/O device 124 is coupled to receive data from the receiver system 108 via a network 126 (e.g., the Internet) and to provide this data to backend servers 122. The backend servers 122 may then provide the data, received from the receiver system 108, to the application servers 118 and the broadcast servers 116. Alternatively, data received from the receiver system 108 may be directly provided to the application servers 118.

Accordingly, the network 126 and the I/O device 126 may operate as a return channel whereby the receiver system 108 is provided with interactivity with the source system 102. Data provided to the headend system 114 via the return channel may include, merely for example, user input to an interactive media application executed at the receiver system 108 or data that is generated by the receiver system 108 and communicated to the source system 102. The data may include information for purchase of a gift media item as will be discussed in further below. The return channel may also provide a channel whereby programs, targeted advertisements/commercials, and applications from the source system 102 may be provided to the receiver system 108.

Within the source system 102, the headend system 114 is also shown optionally to exchange data (e.g., content, code, and application data) with external sources. For example, the headend system 114 may be coupled to one or more content sources 128 and one or more application sources 130 via a network 132 (e.g., the Internet). For example, a content source 128 may be a provider of entertainment content (e.g., movie, songs), a provider of real-time dynamic data (e.g., weather information), a distributor of tangible goods, a service provider (e.g., cable or satellite service provider), and the like. The application source 130 may be a provider of any interactive media application. For example, one or more application sources 130 may provide a TV media player application, electronic program guide and navigation applications, messaging and communication applications, information applications, widgets or interactive applications (e.g., smart phone application), and so forth. The application may be configured to execute on different client devices (e.g., mobile phones, personal computer, STBs, smart phones, or the like). In some embodiments, the content sources 128 and the application sources 130 may be combined within the same entity or entities.

As such, in one embodiment, the headend system 114 may comprise a system that is source agnostic, which links to different companies (i.e., content sources 128 and application sources 130) to provide various forms of media items to a recipient. That is, the source agnostic server (e.g., of the headend system 114) may provide media items from one type of content source 128 to a recipient associated with a different content source 128. For example, the recipient may subscribe to one particular cable television distributor, but may receive a gift media item from a different television distributor or from a tangible goods distributor. It is further noted that a purchaser of the gift media item may be associated with a different content source 128 (e.g., a different cable television distributor) or system than that of a recipient of the gift media item. In an alternative embodiment, the content may be transmitted directed from the external content source 128 or the application source 130 (e.g., via network 132).

Turning now to the example distribution system 104, the distribution system 104 may, in one embodiment, support the broadcast distribution of data from the source system 102 to the receiver system 108. As shown, the distribution network or system 104 may comprise a satellite, cable, terrestrial or Digital Subscribers Line (DSL) network, or any other data communication network or combination of such networks.

The receiver system 108 is shown, in one example embodiment, to include the set-top box (STB) 120 that receives data (e.g., primary and secondary content streams) via the distribution system 104 and modulator box 106 and an input/output device 133 (e.g., modem) for return channel communications with the headend system 114. The receiver system 108 is also shown to include other optional external systems such as a user input device 134 (e.g., a keyboard, remote control, mouse) and a display device 136, coupled to the set-top box 120, for the display of content received at the set-top box 120. In example embodiments, the display device 136 may be a television set, a computer display, or a smart phone display. In various embodiments, the receiver system 108 or components within the receiver system 108 may be referred to as a client device used to access the media.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the set-top box 120 and communicated to the storage unit 110 over a link 138.

It will be appreciated to one skilled in the art that one or more of the modules, applications, or the like of the modulator box 106, the set-top box 120, and the storage unit 110 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein. While the interactive media environment 100 is illustrated having a receiving system 108 including a set-top box 120, it is noted that the receiving system 108 may comprise a mobile device, a personal computer, or any other type of client device that is capable of presenting media and that is coupled to a network for receiving the media.

Figure 2:
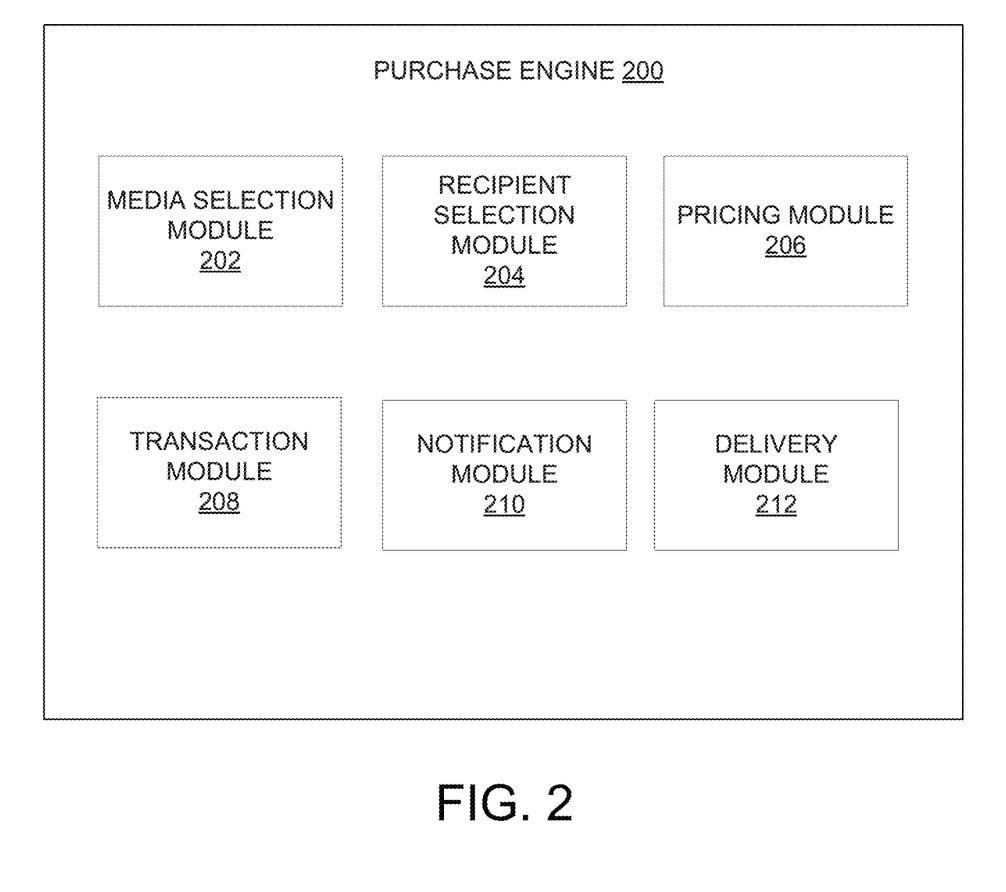
FIG. 2 is a block diagram illustrating an example embodiment of a purchase engine.

Referring now to FIG. 2, a purchase engine 200 of the source system 102 is shown. In example embodiments, the purchase engine 200 is embodied within one or more of the application servers 118. The purchase engine 200 allows a user to purchase media items (e.g., video-on-demand, audio items, interactive applications) for one or more different individuals. These individuals comprise family or friends of the user. In one example embodiment, the purchase engine 200 comprises a media selection module 202, a recipient selection module 204, a pricing module 206, a transaction module 208, a notification module 210, and a delivery module 212. Alternative embodiments may comprise further components or modules not directly related to example embodiments of a gift media system, and thus are not shown or discussed. Furthermore, components of the purchase engine 200 may be located elsewhere or be combined.

The media selection module 202 provides instructions for a mechanism for the user to select a media item (e.g., video or audio items). In example embodiments, the media selection module 202 provides instructions to generate a user interface at a client device associated with the user. In one embodiment, the client device comprises the set-top box 120. In this embodiment, the applications or middleware of the set-top box 120 may receive the instructions and generate the user interface. In alternative embodiments, the client device may be a mobile phone, computing device, or any other device enabled to handle a purchase transaction. In these embodiments, the instructions may render the user interface at the client device. As such, the user may view a catalog of available media and select one of the media items. In an alternative example, the user may be viewing or using a media item (e.g., a movie) and decide to purchase it for another individual. The user may trigger a purchase transaction by selecting a media item.

The recipient selection module 204 manages selection of the other individuals (e.g., via other client devices) for whom the user is purchasing the media item. In one embodiment, the recipient selection module 204 provides a previously generated list of individuals associated with the user to the client device. The list may comprise, in one example, a buddy list. A buddy list may, for example, comprise a previously determined list of friends and family members of the user. In one embodiment, the buddy list is locally stored at the user's client device. In alternative embodiments, the buddy list is stored at the source system 102 (e.g., on a database storing user account information) and associated with an account of the user. The buddy list may be served to the client device, for example, when a user interface is served that allows the user access to their account information, allows the user to access a menu associated a receiving system 108, or when the user triggers a purchase transaction (e.g., while watching a media item). An example of a user interface is provided in FIG. 4.

In another embodiment, the recipient selection module 204 enables the user to select an individual at the time of the purchase transaction. For example, the user may look up and add an individual not already on the user's buddy list. In another example, instructions may be provided to generate a field on the user interface where the user may manually enter identification information (e.g., e-mail address, name and shipping address, phone number or other identifier of a mobile device) for the individual for whom the media item is being purchased.

The pricing module 206 determines a price based on the selected media item. Media items may be priced differently based on the content source 128 (or application source 130), method of delivery (e.g., digital download, tangible media), and recipient. For example, if the recipient subscribes to the same content source 128 that is providing the media item, the media item may be priced lower than if the recipient is not a subscriber.

In one embodiment, the pricing module 20 may provide a list of a plurality of content sources 128 or application sources 130 that provide the selected media item along with a price from each content source 128 or application source 130. The list may also provide different pricing for different media delivery types (e.g., digital download versus a tangible media item being shipped to the recipient). This allows the user, for example, to shop for the lowest priced media item.

In an alternative embodiment, only pricing from the content source 128, application source 130, or source associated with the headend system 114 that is associated with the user purchasing the media item (e.g., a cable or satellite provider that the user subscribes to) is provided. If the selected media item is not available from this one source, then pricing from alternative content sources 128 or application sources 130 is provided.

Additionally, discounts or promotions may be applied. For example, if the user purchases a media item for more than one person, a discount may be provided (e.g., bulk discount). In addition or alternatively, a discount may be provided when a user purchases multiple media items for the same individual. In another example, discounts may be provided for a media item that has been previous purchased by the user (e.g., allowing the user to recommend the media item to other individuals). In one embodiment, a promotional item may be provided based on instructions from the pricing module 206. For example, the promotional item may be inserted into a broadcast or transmission via the distribution network 104 (e.g., via the carousel). The promotional item may include information regarding discounts or promotions for a future purchase.

The transaction module 208 processes the purchase transaction based on the selection of the media item and the recipient(s). In example embodiments, the user provides authorization to process payment for the purchase transaction. In one embodiment, when the purchase engine 200 already knows the identity of the user (e.g., from the user accessing the purchase engine via their client device or when the user logs in with the headend system 114), the transaction module 208 has access to the user's payment information (e.g., credit card, account number) on file. The transaction module 208, thus, can authenticate and authorize the completion of the purchase transaction. In one embodiment, the user provides verification of their identity in order for the purchase transaction to be completed.

The notification module 210 provides notifications to parties involved in the purchase transaction. Thus, each recipient may receive a notification of the gift media item. In some embodiments, the recipient notification may provide information regarding accessing the gift media item. In one embodiment, a URL may be provided that, when selected by the recipient, accesses the media item (e.g., for streaming or download). In other embodiments, the notification module 210 sends metadata (e.g., with some authorization code) to the recipient. The recipient may then download the media item using the metadata. In yet another embodiment, the user may be provided instructions to interact with, or be redirected to, the content source 128 or application source 130. The user may then provide the content source 128 or application source 130 with details to enable the content source 128 or application source 130 to transmit the media item or a link to the media item to the recipient.

Similarly, the user may receive a confirmation notification that the purchase transaction is completed. Furthermore, the same notification or a later notification may indicate that the gift media item is shipped, transmitted, received, or retrieved by the recipient. The notification(s) to the user may be provided to a client device of the user. For example, if the client device is a set-top box, then the notification may be sent to the set-top box and locally stored until the user accesses the notification. Alternatively, the notification may be delivered via SMS or e-mail.

Figure 4:
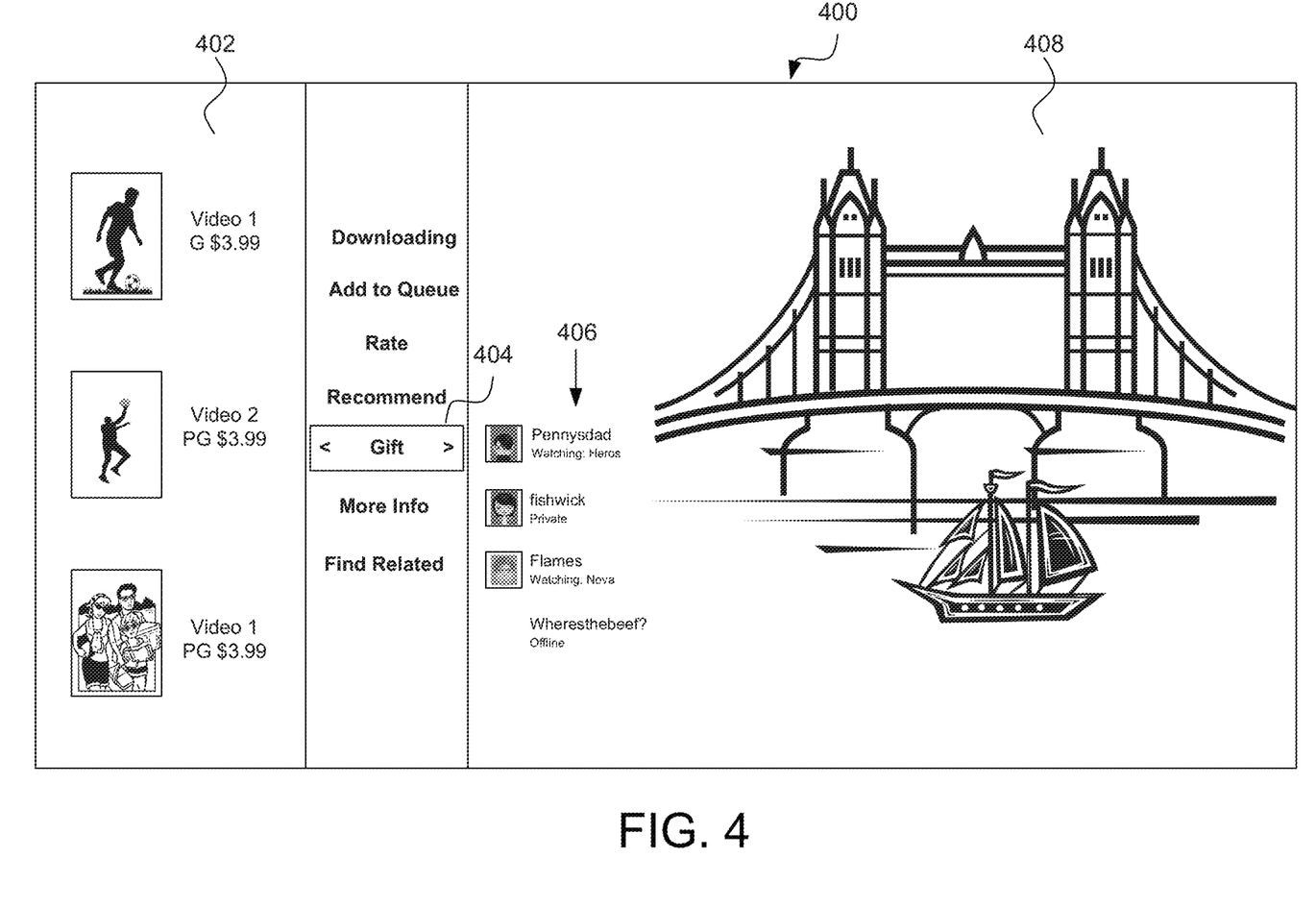
FIG. 4 is an example user interface used to provide the gift media item.

The delivery module 212 triggers delivery of the media item to the recipient. In one embodiment, the delivery module 212 may cause the media item to be transmitted to a device of the recipient (e.g., stored to the recipient's set-top box, downloaded to the recipient's mobile device). For example, the media item may be injected into a media stream being transmitted to the recipient. In yet another embodiment, the delivery module 212 may cause the media item to be associated with the recipient's account such that the recipient may access the media item (e.g., stream or download) via a user interface associated with the recipient's account. Further still, the delivery module 212 may trigger a shipment of the media item to a physical location of the recipient. In example embodiments, the delivery module 212 may cause (e.g., by providing instructions to a component of) the headend system 114 to deliver the media item. Alternatively, the delivery module may cause (e.g., by providing instructions to) the content source 128 or the application source to deliver the media item. An example of a user interface is shown in FIG. 4.

Figure 3:
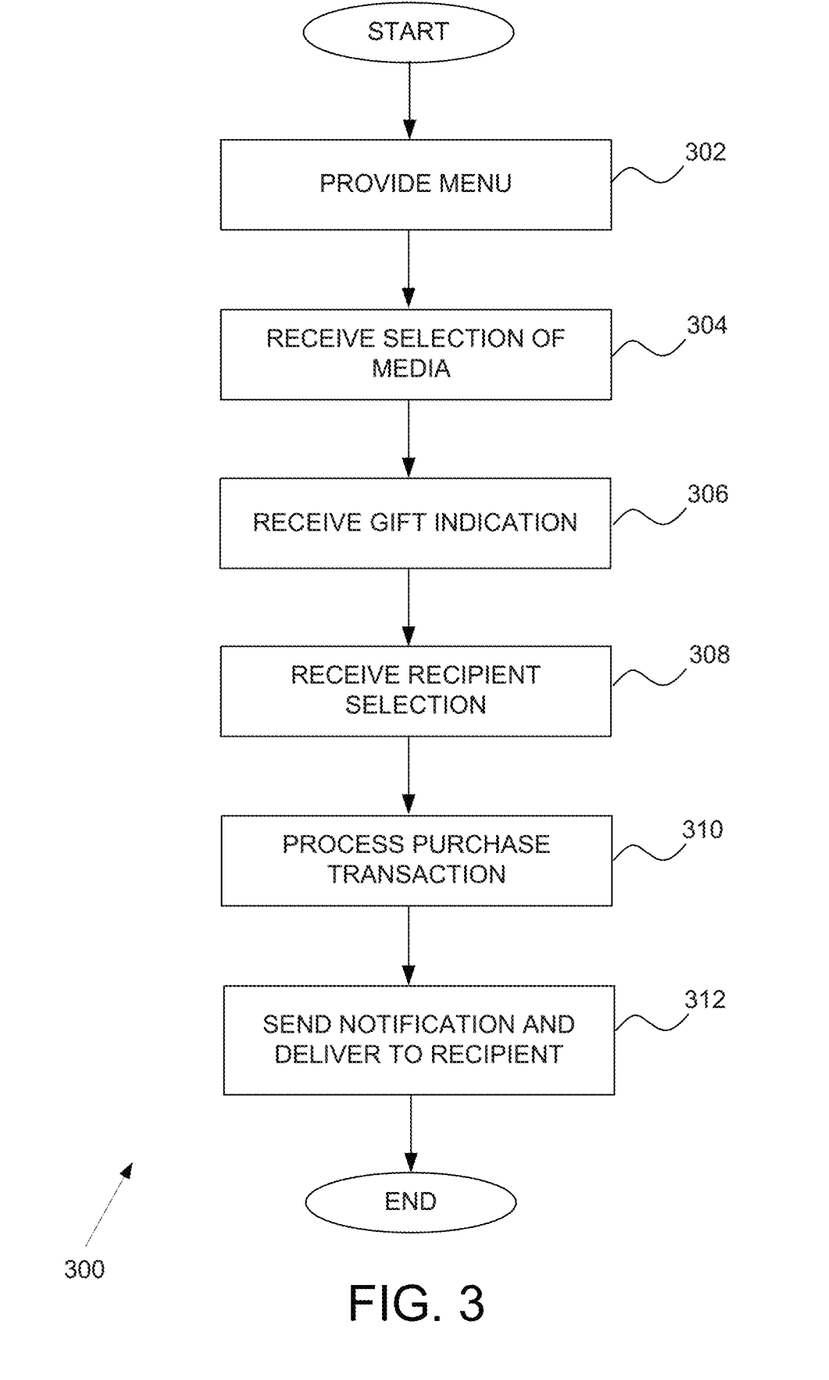
FIG. 3 is a flow diagram of an example method for providing a gift media item.

FIG. 3 is a flow diagram of an example method 300 for providing gift media items. The method 300 may be performed by one or more application servers 118 of the source system 102. In operation 302, a menu is provided to the user. In example embodiments, the user performs an action to indicate a desire to view the menu. For example, the user may click on a menu indicator on their client device (e.g., set-top box 120 (e.g., using a remote control), computing device, mobile phone, or the like). Once selected, the user is provided a user interface including the menu that allows the user to select a media item, download media items, rate media items, or perform other actions. An example of the user interface is discussed in further detail in connection with FIG. 4.

Continuing with the method 300, a media selection is received at operation 304. For example, the user may select the media item from a catalog of available media items. The catalog of the available media items may be stored locally on a client device (including, for example, periodic updating thereof), or sourced from a remote data store (e.g., associated with the source system 102). The media selection may further indicate a delivery method type (e.g., digital broadcast media, downloadable, tangible media) being purchased. After a user has made a selection, the selection information is sent from the client device and received by the media selection module 202. In one embodiment, the selection information may be sent via the return channel (e.g., the network 126).

The user may also indicate that the media item selected is a gift. A gift indication is received at operation 306. It should be noted that operations 304 and 306 may occur simultaneous (e.g., be combined into a single operation) or operation 306 may occur prior to operation 304.

At operation 308, a selection of one or more recipients is received. In one embodiment, the recipient may be chosen from a list associated with the user. The list may be a user-generated list of friends and family members (e.g., buddy list). The buddy list may be locally stored at the user's client device, or the buddy list may be stored at the source system 102 and associated with the user's account. In another embodiment, an identification of a recipient may be manually entered by the user. For example, the user may enter an e-mail address, network handle, name and address, phone number, or any other identifier associated with the recipient. In further embodiments, the user may perform a search to find one or more recipients (e.g., enter a name to find the user's identity) or add a new buddy to their buddy list. It should be noted that operations 304, 306, and 308 may be combined into a single operation.

A purchase transaction is processed in operation 310. In some embodiments, the purchase transaction is automatically triggered upon receipt of the media item selection and recipient selection. During the processing, the user may provide an authorization indication (e.g., selection of a button that indicates that the user agrees to pay for the purchase). The user may also provide a verification indication (e.g., login password) to verify their identity.

Once the purchase transaction is completed, one or more notifications are provided in operation 312. Notification(s) may be provided to the user to confirm the completion of the purchase transaction and delivery of the gift media item. The notification to the user may be provided to the client device of the user. For example, if the client device is a set-top box, then the notification may be sent to the set-top box and locally stored until the user accesses the notification. Alternatively, if the client device is a mobile device or personal computer, then the notification may be delivered via SMS or e-mail. The notification may also be sent to other devices associated with the user (not used to transact the gift purchase transaction).

A notification may also be sent to each recipient of the gift informing each recipient of the gift. The recipient notification may be provided as an e-mail communication, a SMS message, or a message associated with the recipient's account (e.g., for a set-top box embodiment). The notification may be sent to any device or address associated with the recipient (e.g., set-top box, personal computer, mobile phone).

In some embodiments, the recipient notification may provide information regarding accessing the gift media item. In an e-mail embodiment, a URL may be provided that, when selected by the recipient, accesses the media item (e.g., for streaming or download), or the media item, itself, may be provided. Alternatively, the notification may notify the recipient that the media item is accessible via the recipient's account. Further still, the notification may providing tracking information for shipment of tangible media items.

The media item is delivered to the recipient. In one embodiment, the media item may automatically be stored to a device of the recipient (e.g., stored at the recipient's set-top box or downloaded to recipient's mobile device). In yet another embodiment, the media item may be associated with the recipient's account such that the recipient may access the media item (e.g., stream or download) via a user interface associated with the recipient's account. In another embodiment, a tangible version of the media item be may shipped to the recipient.

FIG. 4 is an example user interface 400 used to provide gift media or to access a menu associated with a user's or recipient's account. Thus, the user may use the user interface 400 to transact a purchase for the gift media and access notifications. Furthermore, a recipient may utilize the user interface 400 to access notifications and media items. In one embodiment, the example user interface 400 is displayed to a user on a client device having a display (e.g., the display device 136) that is coupled to a user input device (e.g., user input device 134 such as a mouse, a keyboard, a touch screen or any other user input arrangement). In an example embodiment, when the user accesses the menu, the user interface 400 is provided.

The menu is shown, by way of example, to include a media catalog 402 through which the user may scroll to select a media item. In the example, the user may select, using the user input device, Video 2, which is rated PG and has a price of $3.99. The user also indicates that the purchase transaction is a gift by selecting a gift indicator 404. The user may further indicate one or more recipients from a list of individuals 406 associated with the user. In one embodiment, the purchase engine 200 may suggest that the user select additional recipients at a discount. The purchase transaction may then be processed. In an example embodiment, a single user interface may provide a user an indication of available media items, a display area to facilitate a user selection to gift the media item, and one or more recipients names to receive the gifted media item.

In an alternative example, the user may be viewing or interacting with a media in a media viewing section 408. The user decides to purchase a copy of the media for a friend or family member. As such, the user provides an indication (e.g., via a remote control device or specified key on a device) to initiate a purchase transaction. The indication may then trigger the display of the media catalog 402, the list of individuals 406, or a field to input an individual identifier adjacent to or superimposed, in part, over the media viewing section 408. The media catalog 402, in this example, may comprise one or more of different versions of the media (e.g., uncut version, widescreen version), different media delivery types (e.g., downloadable, tangible, instant data stream to recipient device), or different pricing options (e.g., from various content sources 128).

In one embodiment, the media catalog 402 may provide the user with an option to purchase a service or upgrade the service of the recipient. For example, the user may purchase a one-month subscription to a premium channel or purchase an upgraded multi-premium channel package for the recipient.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine Readable Medium

Figure 5:
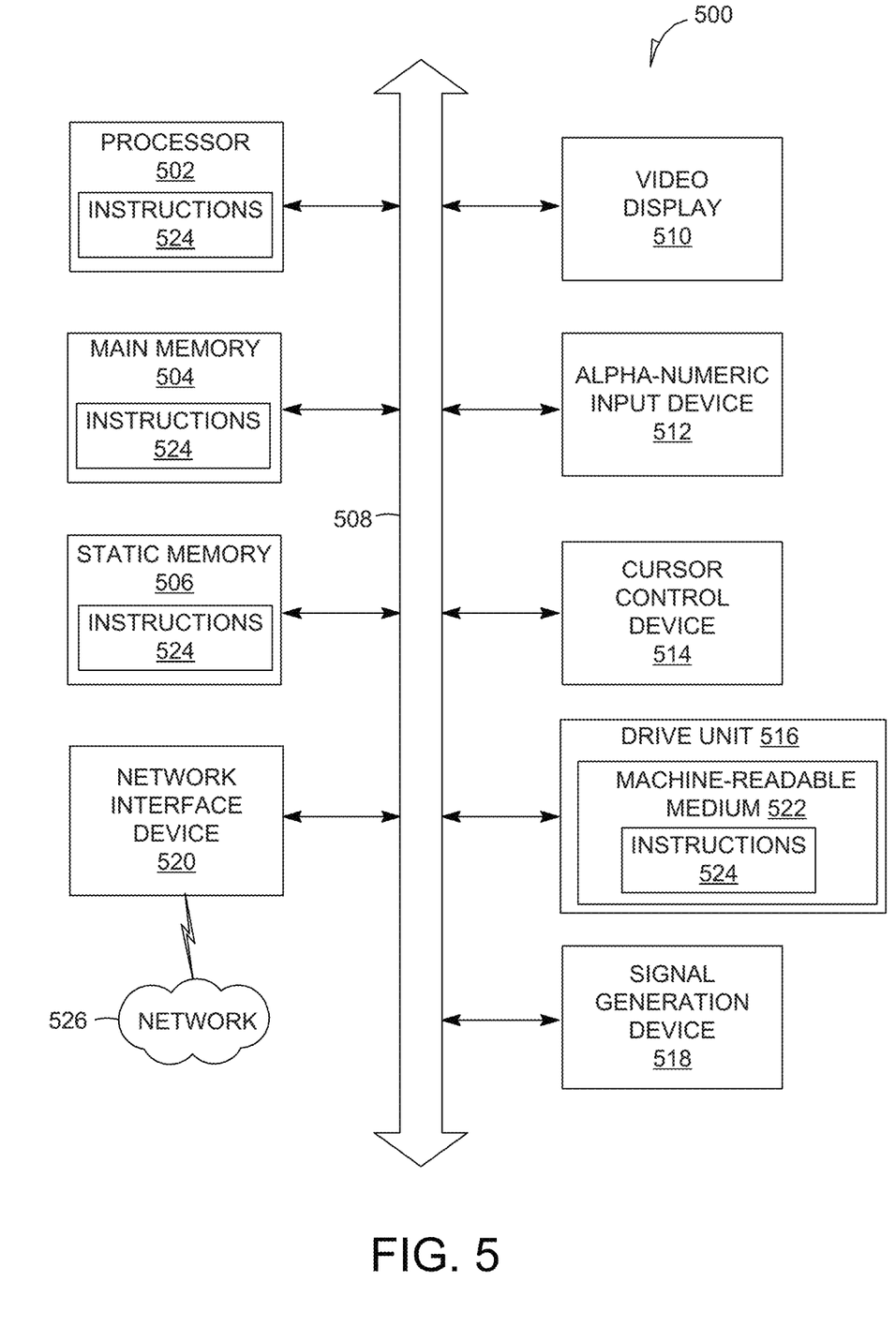
FIG. 5 is a simplified block diagram of a machine in an example form of a computing system within which a set of instructions for causing the machine to perform any one or more of the methodologies discussed herein may be executed.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

Machine Readable Medium

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, with the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. In one embodiment, the machine-readable medium comprises a non-transitory machine-readable storage medium.

Transmission Medium

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention. As used herein, the term "or" may be construed in either an inclusive or exclusive sense.

Thus, a method and system to provide gift media in an exemplary interactive media environment are described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Further, it will be appreciated that the components/modules described or illustrated in the application may represent logical units and do not necessary correspond to one or more physical devices that may be deployed.

The invention claimed is:

1. A method comprising:
receiving, at an interactive media component from a client device of a user, a selection of a media item to be provided to a recipient, the interactive media component having access to at least one source of media content including a source available to the user;
receiving, at the interactive media component from the client device, a selection of the recipient for the media item, the recipient being associated with a unique recipient identifier known to the interactive media component; and causing, by the interactive media component, delivery of the media item to the recipient, the causing delivery comprising:

determining whether the media item to be provided is available from the source available to the user that is providing the media item to the recipient; and responsive to determining that the media item is available from the source available to the user, causing delivery of the media item to the recipient from the source available to the user or responsive to determining that the media item is not available from the source available to the user, causing delivery of the media item to the recipient from an alternative source identified by the interactive media component as having the media item, the alternative source being associated with the interactive media component.

2. The method of claim 1, wherein the interactive media component is source agnostic and is configured to provide media items from a plurality of different sources.

3. The method of claim 1, wherein the unique recipient identifier comprises at least one of an e-mail address, a network handle, a name and address, or a telephone number.

4. The method of claim 1, wherein the source available to the user is a source that the user subscribes to.

5. The method of claim 1, wherein the causing the delivery further comprises:

presenting pricing for the media item from the source available to the user responsive to determining that the media item is available from the source available to the user, or responsive to determining that the media item is not available from the source available to the user, presenting pricing of the media item from the alternative source.

6. The method of claim 1, wherein the alternative source is selected by the user from a list indicating one or more alternative sources identified by the interactive media component.

7. The method of claim 1, wherein:

the source available to the user comprises a cable or satellite provider; and the causing the delivery comprises causing, by the interactive media component, the cable or satellite provider to provide the media item to the recipient that subscribes to a different cable or satellite provider.

8. The method of claim 1, wherein the causing the delivery comprises causing, by the interactive media component, the source available to the user to provide the media item to the recipient that subscribes to a different source.

9. The method of claim 1, wherein the causing the delivery comprises causing shipment of a tangible version of the media item to the recipient.

10. The method of claim 1, wherein the causing delivery comprises transmitting a notification to the recipient, the notification including a uniform resource locator (URL) or metadata to access the media item.

11. The method of claim 1, wherein the alternative source is a source that is not subscribed to by the user.

12. The method of claim 1, wherein the receiving the selection of the media item and the receiving the selection of the recipient occurs while the user is viewing a version of the media item.

13. A system comprising:

one or more hardware processors; and a memory storing instructions that, when executed by the one or more hardware processors, cause the one or more hardware processors to perform operations comprising:

receiving, at an interactive media component from a client device of a user, a selection of a media item to be provided to a recipient, the interactive media component having access to at least one source of media content including a source available to the user;

receiving, at the interactive media component from the client device, a selection of the recipient for the media item, the recipient being associated with a unique recipient identifier known to the interactive media component; and causing, by the interactive media component, delivery of the media item to the recipient, the causing delivery comprising:

determining whether the media item to be provided is available from the source available to the user that is providing the media item to the recipient; and responsive to determining that the media item is available from the source available to the user, causing delivery of the media item to the recipient from the source available to the user or responsive to determining that the media item is not available from the source available to the user, causing delivery of the media item to the recipient from an alternative source identified by the interactive media component as having the media item, the alternative source being associated with the interactive media component.

14. The system of claim 13, wherein the interactive media component is source agnostic and is configured to provide media items from a plurality of different sources.

15. The system of claim 13, wherein the source available to the user is a source that the user subscribes to.

16. The system of claim 13, wherein:

the source available to the user comprises a cable or satellite provider; and the causing the delivery comprises causing, by the interactive media component, the cable or satellite provider to provide the media item to the recipient that subscribes to a different cable or satellite provider.

17. The system of claim 13, wherein the causing the delivery comprises causing, by the interactive media component, the source available to the user to provide the media item to the recipient that subscribes to a different source.

18. The system of claim 13, wherein the causing delivery comprises transmitting a notification to the recipient, the notification including a uniform resource locator (URL) or metadata to access the media item.

19. The system of claim 13, wherein the receiving the selection of the media item and the receiving the selection of the recipient occurs while the user is viewing a version of the media item.

20. A non-transitory machine-readable medium storing instructions that, when executed by one or more hardware processors of a machine, causes the machine to perform operations comprising:

receiving, at an interactive media component from a client device of a user, a selection of a media item to be provided to a recipient, the interactive media component having access to at least one source of media content including a source available to the user;

receiving, at the interactive media component from the client device, a selection of the recipient for the media item, the recipient being associated with a unique recipient identifier known to the interactive media component; and causing, by the interactive media component, delivery of the media item to the recipient, the causing delivery comprising:

determining whether the media item to be provided is available from the source available to the user that is providing the media item to the recipient; and responsive to determining that the media item is available from the source available to the user, causing delivery of the media item to the recipient from the source available to the user or responsive to determining that the media item is not available from the source available to the user, causing delivery of the media item to the recipient from an alternative source identified by the interactive media component as having the media item, the alternative source being associated with the interactive media component.

\* \* \* \* \*